(12) United States Patent
Figge, Sr.

(10) Patent No.: US 6,174,587 B1
(45) Date of Patent: Jan. 16, 2001

(54) SHOCK ATTENUATION BARRIER

(75) Inventor: Irving E. Figge, Sr., Manassas, VA (US)

(73) Assignee: Atlantic Research Corporation, Gainesville, VA (US)

( * ) Notice: Under 35 U.S.C. 154(b), the term of this patent shall be extended for 0 days.

(21) Appl. No.: 09/203,608

(22) Filed: Dec. 2, 1998

(51) Int. Cl.⁷ .................... B32B 1/00; E04B 1/82; E01F 13/00

(52) U.S. Cl. ............ 428/178; 428/158; 428/318.8; 248/562; 181/290; 49/9

(58) Field of Search .................. 428/178, 318.8, 428/94, 158, 402, 312.6; 181/284, 288, 290, 294; 89/36.01; 52/408, 789.1, 793.1, 309.4; 49/9; 248/562

(56) References Cited

U.S. PATENT DOCUMENTS

| | | |
|---|---|---|
| 3,940,811 * | 3/1976 | Tomikawa et al. ............ 428/179 |
| 4,025,996 * | 5/1977 | Saveker ............... 428/174 |
| 4,422,382 | 12/1983 | Marz ................ 102/331 |
| 4,440,296 | 4/1984 | Howe et al. ............ 206/3 |
| 4,586,602 | 5/1986 | Levey ................ 206/3 |
| 4,763,576 | 8/1988 | Kass et al. ............ 102/321 |
| 4,838,166 | 6/1989 | Spies et al. ............ 102/481 |
| 4,850,260 | 7/1989 | Walker et al. ............ 89/34 |
| 5,054,399 | 10/1991 | Bilek et al. ............ 102/481 |
| 5,121,832 | 6/1992 | Fiocchi ................ 206/3 |
| 5,133,258 | 7/1992 | Rock et al. ............ 102/331 |
| 5,212,337 | 5/1993 | Patteri et al. ............ 89/34 |
| 5,390,580 | 2/1995 | Gibbons, Jr. et al. ............ 86/50 |

* cited by examiner

Primary Examiner—Donald Loney
(74) Attorney, Agent, or Firm—Nixon & Vanderhye PC; Frank P. Presta

(57) ABSTRACT

A shock attenuation barrier including a plurality of layers successively arranged including a first layer, a second layer having a plurality of molded geometric shapes, a third layer including foam, a fourth layer having a plurality of molded geometric shapes and a fifth layer. Cavities defined by inside surfaces of the geometric shapes and a surface of the foam layer preferably are filled with a shock absorbing filler material.

18 Claims, 4 Drawing Sheets

SHOCK ATTENUATION BARRIER

The present invention is directed to shock attenuation barriers, and more particularly to an improved shock attenuation barrier comprised of a plurality of layers of shock absorbing materials.

BACKGROUND OF THE INVENTION

For safety reasons, it is imperative that explosives be stored, handled and transported under rigorous rules to preclude unintended or accidental detonation of the explosives. Unfortunately, even under the most controlled circumstances, unintended detonation may occur. It has thus been an objective to minimize to the extent possible any damage caused by such an unintended detonation. Foremost, it is highly desirable to contain an accidental explosion to the smallest area possible. For instance, it is important to prevent the propagation of explosion from one explosive device to another explosive device which might be stored immediately adjacent or near the device that has accidentally exploded.

Numerous types of anti-propagation schemes and blast protection/deflection structures have been proposed. For example, U.S. Pat. No. 4,440,296 to Howe et al. discloses anti-propagation explosive packaging in the form of shields having a core formed of commercially available gypsum board and surrounded by cladding of any convenient material having sufficient abrasion resistance such as, for example, plywood, fiber board, cardboard and the like.

U.S. Pat. No. 4,850,260 to Walker et al. discloses an apparatus for reduction of munition fratricide hazard comprising shields of tungsten-plastic composite material.

U.S. Pat. No. 5,113,258 to Rock et al. discloses a non-propagating holder and package for explosive devices with radially spaced elastomeric walls.

While each of the structures in the above-cited patents are useful for their intended purpose, there nevertheless remains a demand for an efficient, simple and inexpensive shock attenuation barrier.

Furthermore, there is a need to provide increased protection to buildings by providing shock attenuation barriers to an exterior portion thereof. Specifically, in recent times, the threat to buildings by terrorist car bombs has significantly increased. Such bombings can be particularly destructive if the bomb blast reaches load-bearing elements of the building whereby a full collapse of the building might result.

In light of the foregoing, it is an object of the present invention to provide a shock attenuation barrier having a multi-layered structure that has superior shock attenuation, energy absorption characteristics and survivability, and which is equally useful as an anti-propagation structure and a general-purpose blast protection material for buildings or other structures.

It is a further object of the present invention to provide a shock attenuation barrier that can have a relatively flat or curved surface.

It still another object of the present invention to provide a shock attenuation barrier that is relatively simple and inexpensive to manufacture.

SUMMARY OF THE INVENTION

These and other objects are achieved by the present invention by providing a shock attenuation barrier, comprising a plurality of layers successively arranged including a first shock attenuation layer, a second layer having a plurality of geometric shapes molded or otherwise disposed therein and a third, preferably, foam layer adjacent the second layer. The above described structure may further include additional layers, and preferably fourth and fifth layers having a configuration and comprising material substantially the same as the first and second layers, respectively.

In accordance with the present invention, the first and fifth layers preferably include a thermoplastic core and fiber reinforced thermoset resin faces.

The plurality of geometric shapes preferably include truncated tetrahedrons.

The third layer preferably has substantially smooth faces. Also, a filler material is preferably disposed within a cavity defined by the foam layer and an inside surface of the second layer. The filler material may be ceramic micro balloons, pumice or any other suitable shock absorbing material.

In one embodiment, the plurality of layers of the barrier are all substantially parallel to a single plane. In another embodiment, the barrier is curved.

Each of the plurality of layers of the barrier is adhesively bonded to an adjacent layer, and the thickness of the joined layered barrier preferably is about 1 to 7 inches.

In another embodiment, the barrier can be constructed in sections of about 4 feet high and 8 feet wide, or 8 feet high by 4 feet wide, depending on its orientation. The barrier may also be as thick as 4 feet, or any other suitable thickness, with correspondingly large geometric shapes.

The barrier can be used as a box liner to prevent explosion propagation of stored munitions and/or as building protection against external explosions, such as car bombs.

For building protection, the barrier preferably is incorporated into a wall that extends around the periphery of the building. The wall preferably defines a cavity in which sand or any other suitable material is disposed so that the wall becomes even more resistant to bullets and blasts from explosions. In a particular embodiment, the wall has a substantially right triangular cross-section such that the wall stably rests on the ground and has its hypotenuse facing away from the building the wall is intended to protect. The hypotenuse preferably has a curved surface so that any shock wave from an explosion is aerodynamically directed away from the building.

BRIEF DESCRIPTION OF THE DRAWINGS

The present invention will be more fully understood upon reading the following Detailed Description in conjunction with the accompanying figures, in which reference numerals are used consistently to indicate like elements, and in which.

DETAILED DESCRIPTION OF THE PREFERRED EMBODIMENTS

Figure 1:
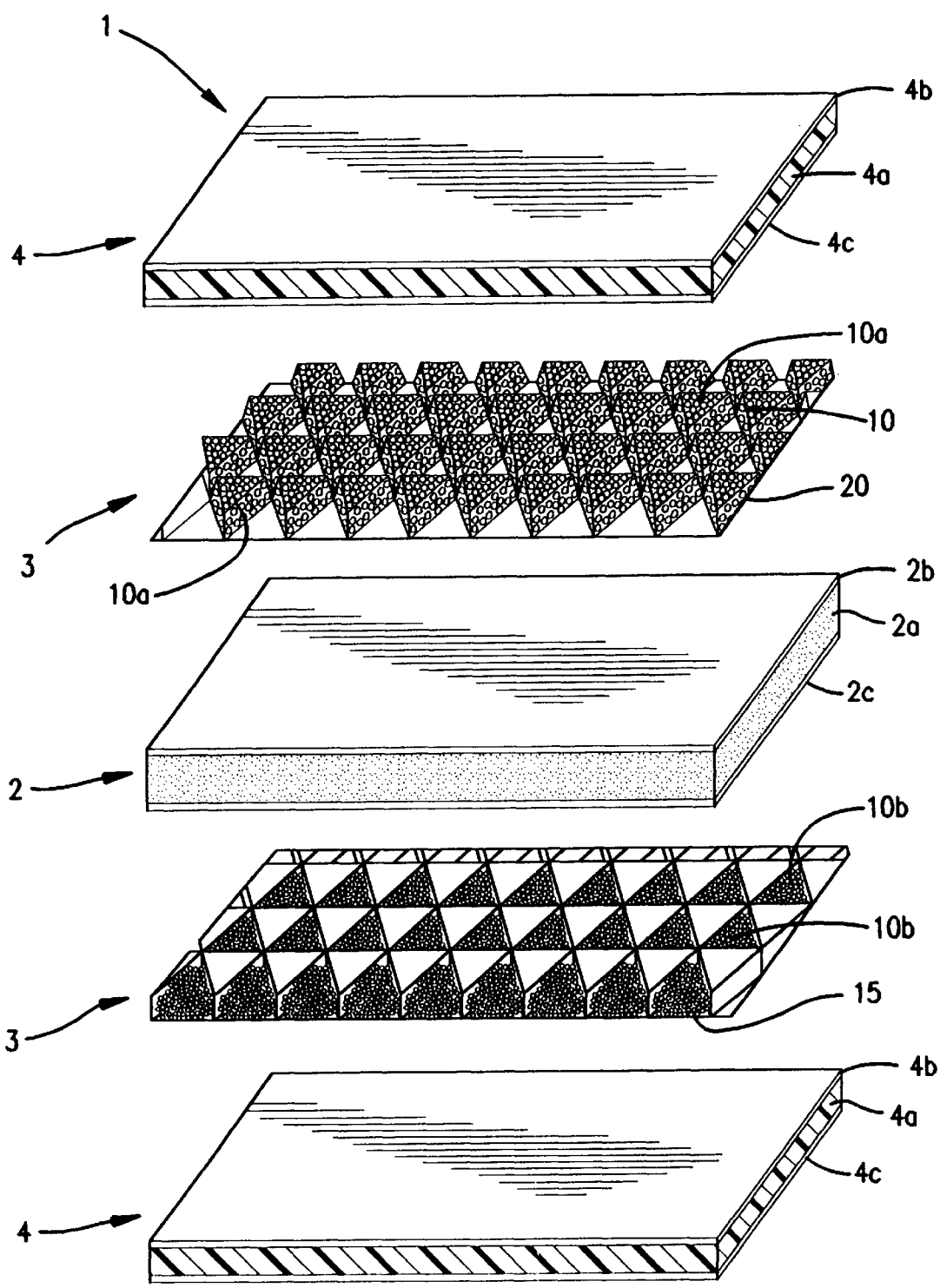
FIG. 1 shows an exploded perspective view of the plurality of layers in accordance with a preferred embodiment of the present invention.
Figure 2:
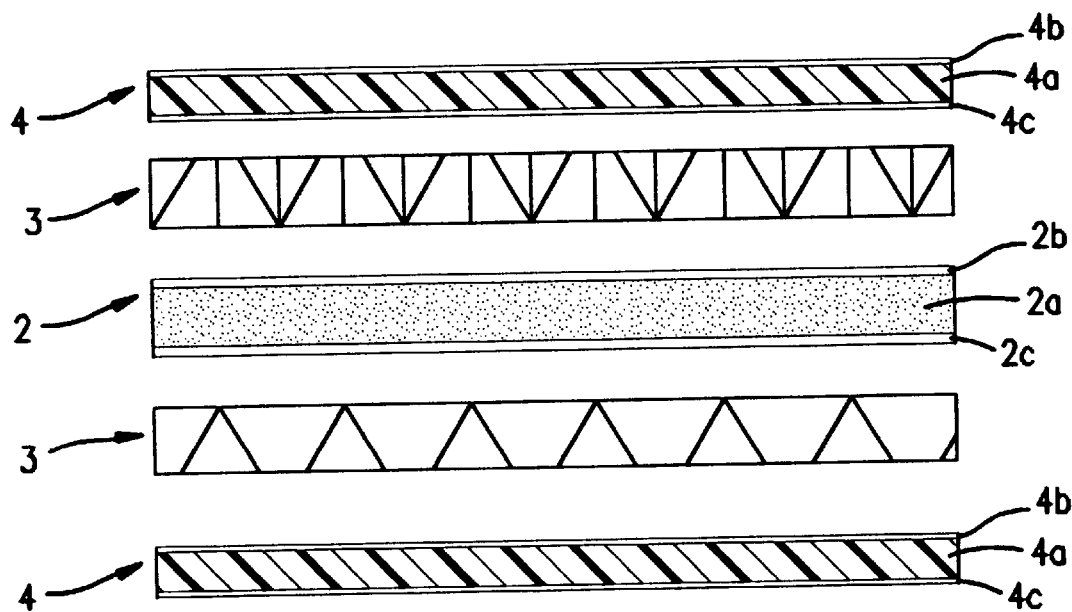
FIG. 2 shows a cross-sectional view of the separated layers of the barrier in accordance with a preferred embodiment of the present invention.
Figure 3:
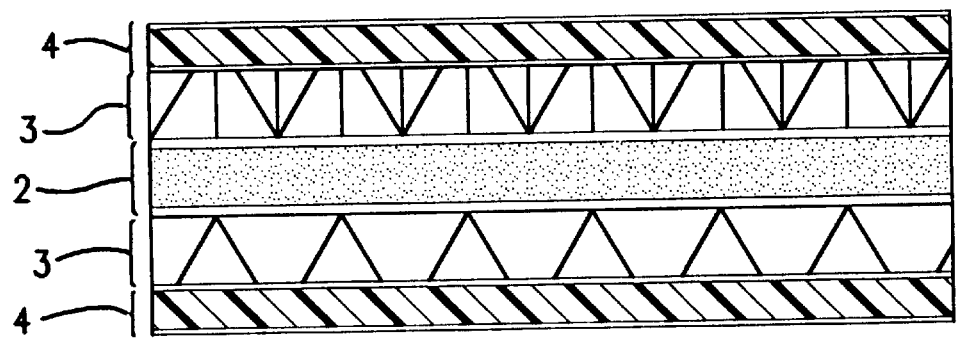
FIG. 3 shows the structure of the barrier in joined form in accordance with a preferred embodiment of the present invention.

The structure of a preferred embodiment of the barrier of the present invention is depicted in FIGS. 1–3. As can be seen generally in those figures, the barrier 1 comprises a plurality of layers joined together resulting in a multi-layered article that has superior shock attenuation properties as will be explained in more detail below.

Specifically, the barrier 1 comprises a foam board 2 that preferably includes a foam inner core 2a and faces 2b and 2c. Foam inner core 2a may be conventional foam well known to those skilled in the art. Faces 2b and 2c are preferably cardboard, but may be any suitable material that provides stiffness properties to the foam board 2 and a surface to which other layers may be adhesively bonded. The foam board 2 is preferably about ¼ inch thick. Foam board 2 may be replaced with any other material that can be joined to adjacent layers. For example, foam board 2 can be replaced with cardboard, paper, plastic sheeting, or any other suitable material.

Foam board 2 is sandwiched between sheets 3 each having molded or disposed thereon a repeating geometric shape resulting in a geometric array. According to the preferred embodiment of the present invention, the geometric shape is a truncated tetrahedron 10. A tetrahedron has the highest surface area per unit volume of any shape and therefore the ability to absorb maximum energy. Its complex geometry deflects and/or distorts shock waves resulting from a blast or explosion, for example, and thereby significantly reduces potential damage to a structure that is being protected. The sheets 3 are preferably made from a thermoplastic, but may also be comprised of any other suitable material that can be molded or otherwise formed into a repeating geometric pattern. For example, aluminum, or any other suitable metal can be employed for sheets 3. Concrete may also be suitable. In a more particular embodiment, the sheets 3 are comprised of polycarbonate thermoplastic material which can reduce ballistic fragment penetration. In a specific embodiment, the height of each tetrahedron 10 is about 0.31 inch and the wall thickness of each tetrahedron 10 is about 0.063 inch. It should be noted that ductility and thickness of the material comprising the sheets 3 are relevant considerations with respect to absorbing shock and may be modified accordingly.

In the preferred embodiment, the sheets 3 are adhered to the foam board 2 such that the truncated tips 10a of the tetrahedrons 10 are pointed away from foam board 2. On the other hand, open bases 10b are open towards foam board 2. Any suitable adhesive may be used to join sheets 3 to foam board 2. An elastomeric adhesive has been shown effectively to join and to seal sheets 3 to foam board 2. It is noted that the geometric shapes molded or otherwise disposed on sheet 3 can take virtually any form, e.g. hemispherical, rectangular, cubical, as long as an open side can be sealed (directly or through the use of a sealing material) against foam board 2.

As further shown in FIGS. 1–3, preferably the orientation of the molded sheets is such that the triangular elements of the bases of tetrahedrons 10 of one molded sheet 3 align with the open triangular elements of the tetrahedrons 10 on the other molded sheet 3. Such orientation provides improved shock absorption capability by properly distributing the shock in the barrier 1.

As shown in FIG. 1, cavities 15 defined by the inner surfaces of tetrahedrons 10 and cardboard surface 2b, 2c of foam board 2 are filled with a filler 20. Filler 20 is preferably comprised of ceramic micro balloons. Other fillers, e.g. pumice, may also be employed. Generally, however, for purposes of blast protection it is believed that relatively high strength/high modulus filler particles are superior to low strength/low modulus filler particles. The filler particles preferably have a size on the order of microns. One micro balloon filler that has been determined to be effective is ENDOSPHERE-SG available from PQ Corporation.

As shown in the figures, sheets 4 are adhered to the exposed surfaces of the sheets 3. Each sheet 4 is preferably comprised of materials like those disclosed in U.S. Pat. No. 5,124,196 to the present inventor. The entirety of the disclosure of that patent is incorporated herein by reference. Generally, sheet 4 comprises a thermoplastic core material 4a and fiber reinforced thermoset resin face sheets 4b, 4c. The selection of the particular plastics and resins used are a function of environmental, ballistic, ductility and cost considerations. In a preferred embodiment, the core material 4a is ABS with unidirectional (0/90) glass epoxy face sheets 4b, 4c. The thickness of the face sheets 4b, 4c is on the order of 0.115 inch. Additionally, face sheets 4b or 4c may include, for aesthetic purposes, particular texture or color, as will be explained later herein.

It is noted that not all layers need be included to provide some measure of blast protection. For example, it is possible to eliminate from the structure shown in FIGS. 1–3 one or more layers and still obtain a structure that can be useful as a barrier. For example, one pair of adjacent layers on one side of foam board 2 could be eliminated thereby leaving faces of a layer 4 and foam board 2 exposed.

Another configuration that is possible is to stack two or more barriers 1 together. The barriers can be bolted together or adhesively bonded to each other. To add even further blast protection, the barriers 1 can be stacked together with a layer of micro balloons disposed therebetween. In a preferred embodiment such a micro balloon layer is about one eighth inch thick.

Test Results

A metal munition container holding 36 shaped charge munitions (the donor) was encased with an approximately 1.1 inch thick barrier 1 in accordance with the present invention and placed next to a sister munition container (the receptor) also surrounded with the barrier 1 of the present invention and holding 36 munitions (12 live closest to the donor and 24 inert). The assembly was placed in a wire cage and the center munition in the donor container detonated, causing 25 of the remaining munitions in the donor container to detonate/explode. None of the charges in the receptor container detonated or was damaged. The receptor container simply crushed thereby exposing the munitions in the receptor.

Controlled tests indicate that the barrier 1 is able to reduce the shock loading for a 2×2 inch 50/50 Pentolite donor from 280 Kbars without the barrier 1 to 12 Kbars with the barrier.

Anti-Terrorist Blast Deflection

In addition to being a superior anti-propagation explosion barrier, the barrier 1 in accordance with the present invention can effectively be used on or adjacent the exterior of buildings to reduce significantly the effects of an explosion from, for example, a terrorist car bomb. Specifically, the barrier 1 of the present invention can be easily, quickly and inexpensively installed on the exterior or in the vicinity of a building.

When used in such a manner, the barrier 1 not only absorbs shock from a blast, but also due to its structure, as disclosed herein, can deflect a shock wave. The barrier 1 is highly deformable and transmitted shock energy is thus absorbed in the deformation process thus minimizing any further transmission of energy. Moreover, the barrier 1 of the present invention is a quasi isotropic structure and thus performs equally well regardless of the direction of a blast wave.

Figure 4A:
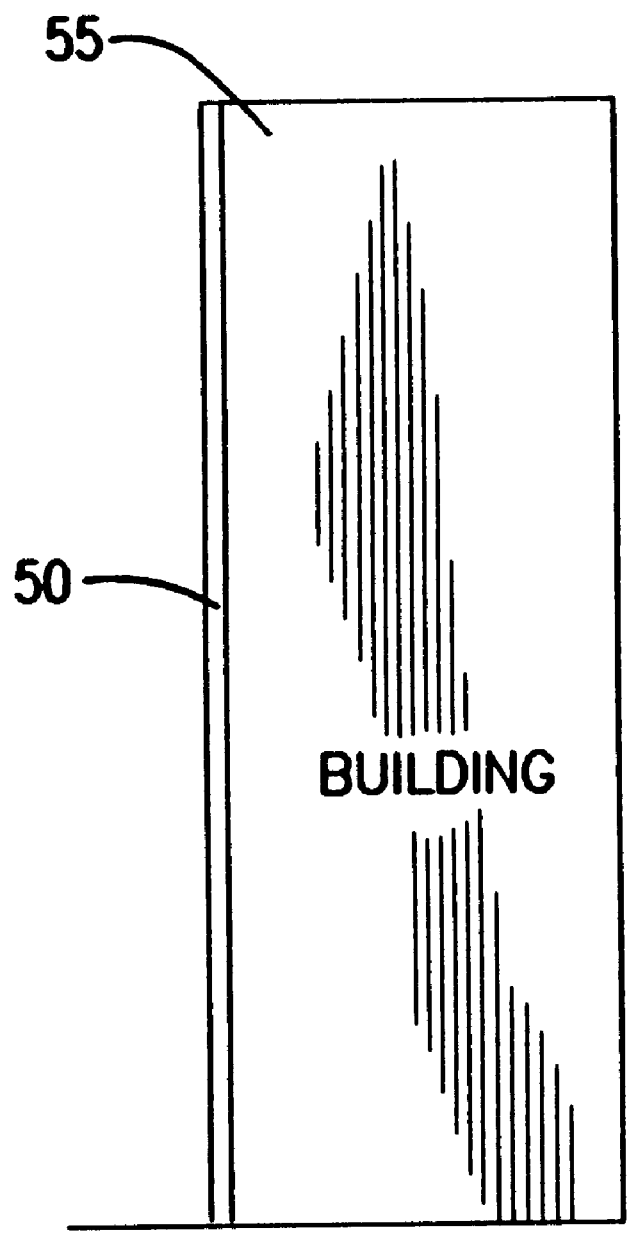
FIGS. 4a–4c show how the barrier of the present invention can be used to protect a building from blasts originating exterior to the building.
Figure 4B:
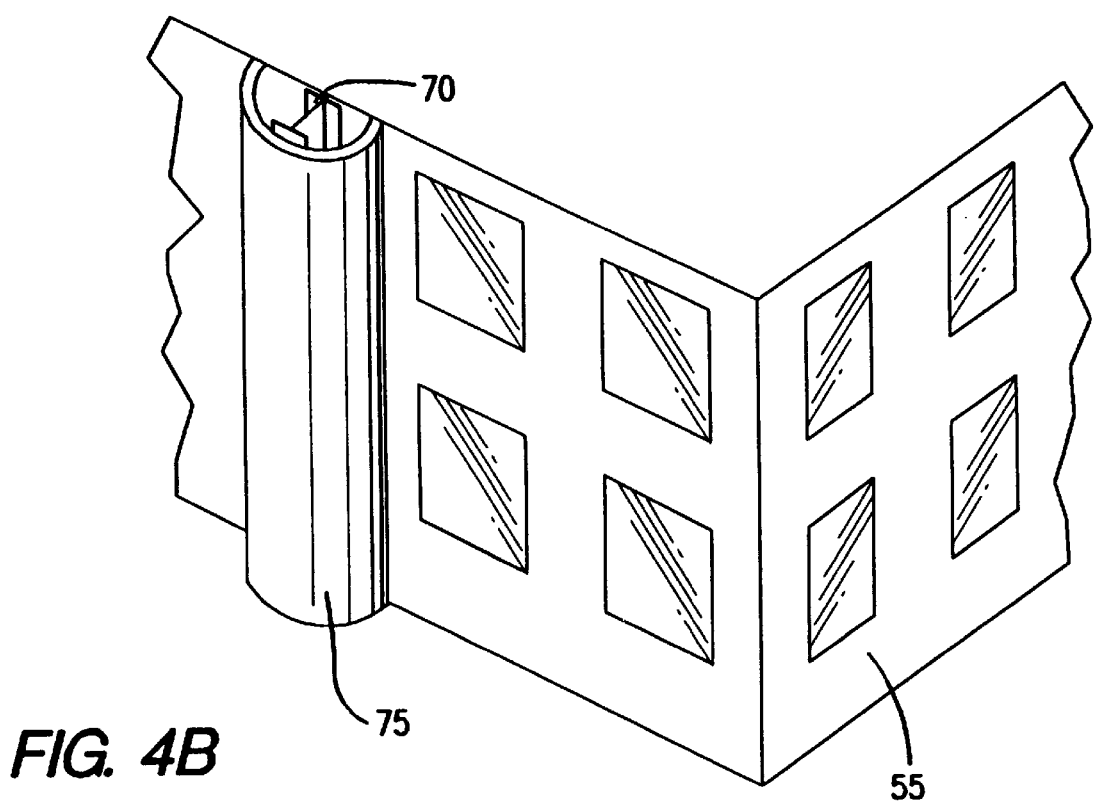

Referring first to FIGS. 4a and 4b, the barrier of the present invention can be manufactured in sections, e.g. 4–10 feet wide and 4–10 feet high or any other convenient size, weighing approximately 2 pounds per square foot, and be hung from cables attached to a roof, or in any other suitable manner, to form a continuous wall 50 on the outside of a building 55. The panels can be offset from the building and/or made translucent so that light can still enter the building through its windows. Further, the panels can be made to be aesthetically pleasing by providing the exposed outermost layer, e.g. layer 4, with texture or a particular shape and/or color so that the panel matches the existing contour or texture of the building.

FIG. 4b shows how a curved section of the barrier of the present invention can be used to protect load bearing elements of a building. As shown, a vertical I-beam 70 is preferably secured to the building directly in front of a load bearing element and a curved panel 75, e.g. 180 degrees, is attached thereto. If an explosion occurs, the blast force will be deflected around the load bearing element as a result of the energy absorbing/deflecting properties of the barrier in accordance with the invention, thereby reducing the possibility of building collapse.

Figure 4C:
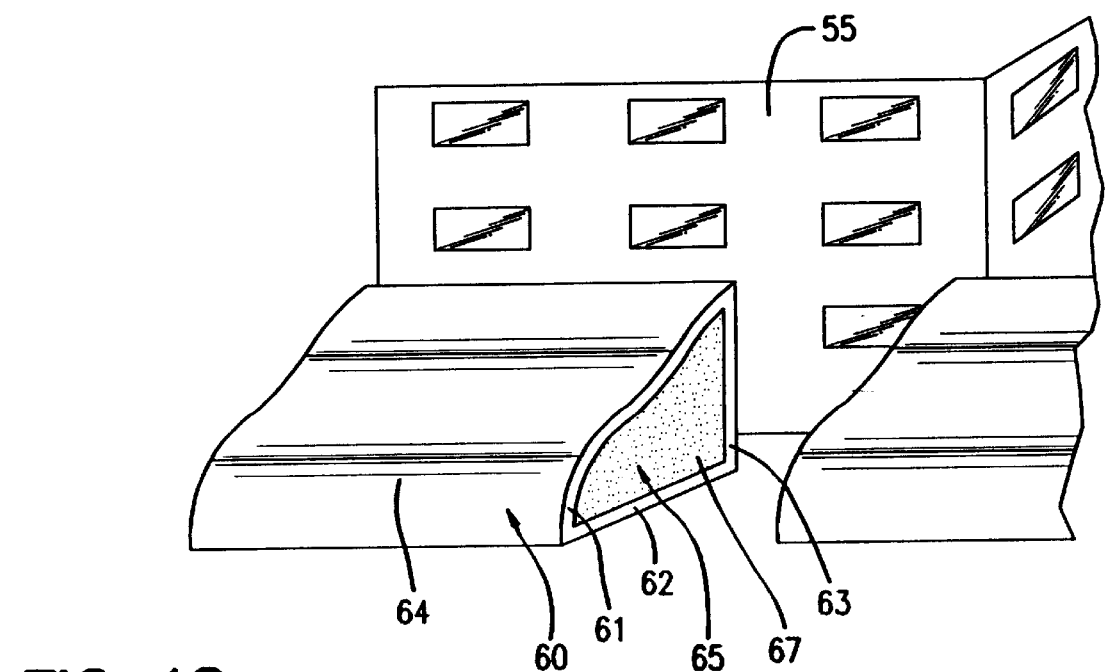

Another approach to use the present invention as a building security device is shown also in FIG. 4c. In the embodiment shown, a wall 60 is erected around the periphery of building 55. The wall 60 preferably is generally triangular in shape with a base 62, an upward extending inside wall 63 and hypotenuse 61, which preferably has a surface 64 that is curved in such a manner that a shock wave produced from an explosion would be aerodynamically deflected up and over the building 55. A least a portion of one of base 62, inside wall 63 and hypotenuse 61 comprises the multiplayer barrier 1 in accordance with the present invention. While FIG. 5c depicts a right triangle cross-section for wall 60, any suitable cross-sectional shape can be implemented, for example, square or rectangular, or triangular with an oblique angle. After erection, an inner cavity 65 of the wall 60 preferably is filled with sand 67 or any other suitable material to provide additional energy absorbing capability, to help hold the wall in place and to allow for easy removal of the wall 60, if desired. Furthermore, with such a filling, the wall 60 exhibits greater resistance to bullets or other projectiles.

The present invention has been described in terms of presently preferred embodiments so that an understanding of the present invention can be conveyed. The present invention should therefore not be seen as limited to the particular embodiments described herein. Rather, all modification, variations, or equivalent arrangements that are within the scope of the attached claims should be considered to be within the scope of the invention.

What is claimed is:

1. A shock attenuation barrier, comprising a first outer layer, a second intermediate layer and an inner layer;

said first outer layer having a thermoplastic core and fiber reinforced thermoset resin outer sheets;

said second intermediate layer having a plurality of truncated tetrahedrons thereon which extend toward said first layer; and said inner layer comprising a foam layer, said truncated tetrahedrons defining cavities in said second layer that open toward said inner layer;

said first layer, said second layer and said inner layer being secured together.

2. The barrier of claim 1 wherein said truncated tetrahedrons are of a substantially uniform size and disposed in a repeating pattern that covers substantially the entire surface of said second layer.

3. The barrier of claim 1 wherein said cavities are filled with a shock absorbing material.

4. The barrier of claim 3 wherein said shock absorbing material comprises at lest one of ceramic micro balloons and pumice.

5. The barrier of claim 1 wherein said second layer is formed of at least one of thermoplastic material and metal.

6. The barrier of claim 1 wherein said foam layer comprises a foam core and outer sheets.

7. A barrier of claim 6 wherein said outer sheets of said foam layer are formed of cardboard.

8. The barrier of claim 1 wherein said first layer, said second layer and said inner layer are adhesively secured together.

9. The barrier of claim 1 further comprising a third immediate layer disposed on and secured to the opposite side of said inner layer from said second layer, and a fourth outer layer secured to said third layer, said third layer having a plurality of truncated tetrahedrons thereon which extend toward said fourth layer and define cavities in said third layer that open toward said inner layer.

10. The barrier of claim 9 wherein said fourth layer has a thermoplastic core and fiber reinforced thermoset resin outer sheets.

11. The barrier of claim 9 wherein said truncated tetrahedrons of said third layer are of a substantially uniform size and disposed in a repeating pattern that covers substantially the entire surface of said third layer.

12. The barrier of claim 9 wherein said cavities in said third layer are filled with a shock absorbing material.

13. The barrier of claim 12 wherein said shock absorbing material of said third layer comprises at least one of ceramic micro balloons and pumice.

14. The barrier of claim 10 wherein said third layer is formed of at least one of thermoplastic material and metal.

15. The barrier of claim 9 wherein said truncated tetrahedrons of said second layer and said third layer are in substantial alignment.

16. The barrier of claim 1, wherein a thickness of the barrier is about 1 to 7 inches.

17. The barrier of claim 1, wherein the barrier is about 4–10 feet high and 1–10 feet wide.

18. The barrier of claim 1, further comprising supporting means for supporting the barrier relative to a structure.

* * * * *